(12) United States Patent
Pan et al.

(10) Patent No.: US 6,449,057 B1
(45) Date of Patent: Sep. 10, 2002

(54) IMAGE DATA ADDRESSING FOR BIT ROTATION BLOCK WITHIN DIGITAL IMAGE PROCESSORS

(75) Inventors: Danjie Pan, Costa Mesa; Chong-Hing Cheung, Mission Viejo, both of CA (US)

(73) Assignee: ViewAhead Technology, Inc., Redmond, WA (US)

( * ) Notice: Subject to any disclaimer, the term of this patent is extended or adjusted under 35 U.S.C. 154(b) by 0 days.

(21) Appl. No.: 09/282,949

(22) Filed: Apr. 1, 1999

(51) Int. Cl.[7] .............................................. G06H 15/00
(52) U.S. Cl. ..................................................... 358/1.16
(58) Field of Search ........................... 358/1.1, 1.2, 1.5, 358/1.8, 1.18, 1.16, 1.17, 470; 382/293, 296, 297, 301

(56) References Cited

U.S. PATENT DOCUMENTS 4,084,195 A * 4/1978 Pereira ....................... 358/470

\* cited by examiner

*Primary Examiner*—Arthur G. Evans
(74) *Attorney, Agent, or Firm*—Stoel Rives LLP (57) ABSTRACT

An image data addressing system for a digital image printer operates on a plurality of image data having a horizontal format. Ink jet type digital printers require the alignment of the image data in a horizontal fashion to accommodate the vertical, mechanical arrangement of the ink jet nozzles. A program adapted to the specific components, circuitry and other characteristics of the digital image printer performs data addressing on the image data for preparation for ink jet firing by the ink jet nozzles. A common, integrated memory is used to perform the image data processing of the plurality of image data. The digital image printer adaptable program governs the storing of the image data so that it is adaptable to the specific components, circuitry and other characteristics of the digital image printer. An unused, consecutive portion of the integrated memory is provided at certain times during the image data processing. In certain embodiments of the invention, the image data addressing system is contained within a multi-functional peripheral. The multi-functional peripheral device is a peripheral device containing several internal devices that operate either independently or cooperatively to perform image data processing. Alternatively, the image data addressing system is found in a stand alone device that performs primarily one single function, namely, image data addressing. Highly computationally intensive functions use the unused, consecutive portion of the integrated memory. One particular function that is highly computationally intensive is motor control within an ink jet digital image printer.

27 Claims, 11 Drawing Sheets

IMAGE DATA ADDRESSING FOR BIT ROTATION BLOCK WITHIN DIGITAL IMAGE PROCESSORS

INCORPORATION BY REFERENCE

The following applications are hereby incorporated herein by reference in their entirety and made part of the present application:

1) U.S. patent application Ser. No. 09/283,876, filed Apr. 1, 1999;
2) U.S. patent application Ser. No. 09/282,956, filed Apr. 1, 1999; and
3) U.S. patent application Ser. No. 09/283,175, filed Apr. 1, 1999, issued as U.S. Pat. No. 6,153,955 on Nov. 28, 2000.

BACKGROUND

1. Technical Field

The present invention relates generally to digital image data processing; and, more particularly, it relates to digital image printing.

2. Description of Related Art

Conventional digital image printing systems commonly employ addressing schema that necessarily require a number of memory buffers in a disjointed arrangement. These conventional digital image printing systems are often hardwired to accommodate a fixed number of ink jet nozzles. Scaleability across a wide number of digital image printers having varying ink jet nozzle numbers is difficult without modifying the design of addressing circuitry that performs the image data addressing and image data management.

Typically, conventional digital image printers employ a number of memory buffers to handle the image data for performing image data processing functions such as bit rotation. Bit rotation is required for many digital image ink jet printers, in that, the inherent, vertical mechanical configuration of the ink jet nozzles coupled with the typical horizontal arrangement of image data require bit rotation of the image data to provide proper reproduction of the image.

The conventional manner of employing a number of discrete memory buffers to perform bit rotation of segmented portions of the image data can result in a significant amount of unused memory in each of the discrete memory buffers. If one integrates over the total number of unused memory in each of the discrete memory buffers having a portion of unused memory, conventional digital image printers may possess a large amount of idle memory that is intrinsically disjointed. This disjointedness results in inefficient use of the digital image printer's total processing resources. Utilizing these disjointed portions of unused memory in each of the discrete memory buffers is difficult, in that, a significant amount of effort is dedicated to memory management to use the available portions of the discrete memory buffers effectively.

Conventional digital image printers perform a number of functions, some of which are highly computationally intensive. The conventional manner of dedicating a fixed amount of memory to each of the functions inherently leads to unused portions of memory in a number of the discrete memory buffers. In addition, certain functions within the digital image printer require significantly more memory, at certain times, for their respective functions than is available. This typically results in slowed processing within the digital image printers.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in an image data addressing system for a digital image printer. The image data addressing system operates on a plurality of image data. Each image datum of the plurality of image data has a predetermined form. In certain embodiments of the invention, the predetermined form of the image data is in a horizontal format. Ink jet type digital printers require the alignment of the image data in a horizontal fashion to accommodate the vertical, mechanical arrangement of the ink jet nozzles. A program that is adaptable to the specific components, circuitry and other characteristics of the digital image printer performs data addressing on the plurality of image data.

Another aspect of the invention is the use of a common, integrated memory that is used to perform the image data processing of the plurality of image data. The integrated memory stores a predetermined number of the plurality of image data for subsequent image processing. The manner in which the plurality of image data is stored is governed by the digital image printer adaptable program that is adaptable to the specific components, circuitry and other characteristics of the digital image printer. The plurality is of image data is stored for image data processing by the image data addressing system such that an unused, consecutive portion of the integrated memory is maintained. As more and more image data is required in the integrated memory for image data processing, then the unused, consecutive portion of the integrated memory decreases in size. However, during subsequent image data processing steps, the unused, consecutive portion of the integrated memory is increased as less image data is required, during a given moment in time, within the integrated memory for image data processing.

The image data addressing system of the present invention is compatible with digital image printers having various numbers of ink jet nozzles. The bit rotation that is performed using the image data addressing of the present invention is intrinsically scaleable for digital image printers having any number of ink jet print nozzles. The operation of the image data addressing system merely requires sufficient integrated memory to accommodate the ink jet digital printer of a set of ink jet printers having the largest number if ink jet print nozzles. For ink jet digital printers having fewer than the maximum number of ink jet print nozzles permitted by the integrated memory, the remaining unused, consecutive portion of the integrated memory is used to perform other operations and functions.

In certain embodiments of the invention, the image data addressing system is contained within a multi-functional peripheral. The multi-functional peripheral device is a peripheral device containing a plurality of internal devices wherein each of the devices operates either independently or cooperatively to perform image data processing on the plurality of image data. Alternatively, the image data addressing system is found in a stand alone device that performs primarily one single function, namely, image data addressing. In embodiments where there is unused, consecutive portion of the integrated memory, other functions required by the multi-functional peripheral are performed using the unused, consecutive portion of the integrated memory. It is desirable to perform highly computationally intensive functions using this unused, consecutive portion of the integrated memory. One particular function that is highly computationally intensive is motor control within an ink jet digital image printer. The motor control function typically requires a significant amount of memory, and given the availability of additional memory in the unused, consecutive portion of the integrated memory, the motor control function can be performed without dedicating a larger portion of memory to this specific function, thereby conserving valuable real estate in the circuitry of the multi-functional peripheral and in the motor control circuitry in particular.

Other aspects, advantages and novel features of the present invention will become apparent from the following detailed description of the invention when considered in conjunction with the accompanying drawings.

DETAILED DESCRIPTION OF DRAWINGS

Figure 1:
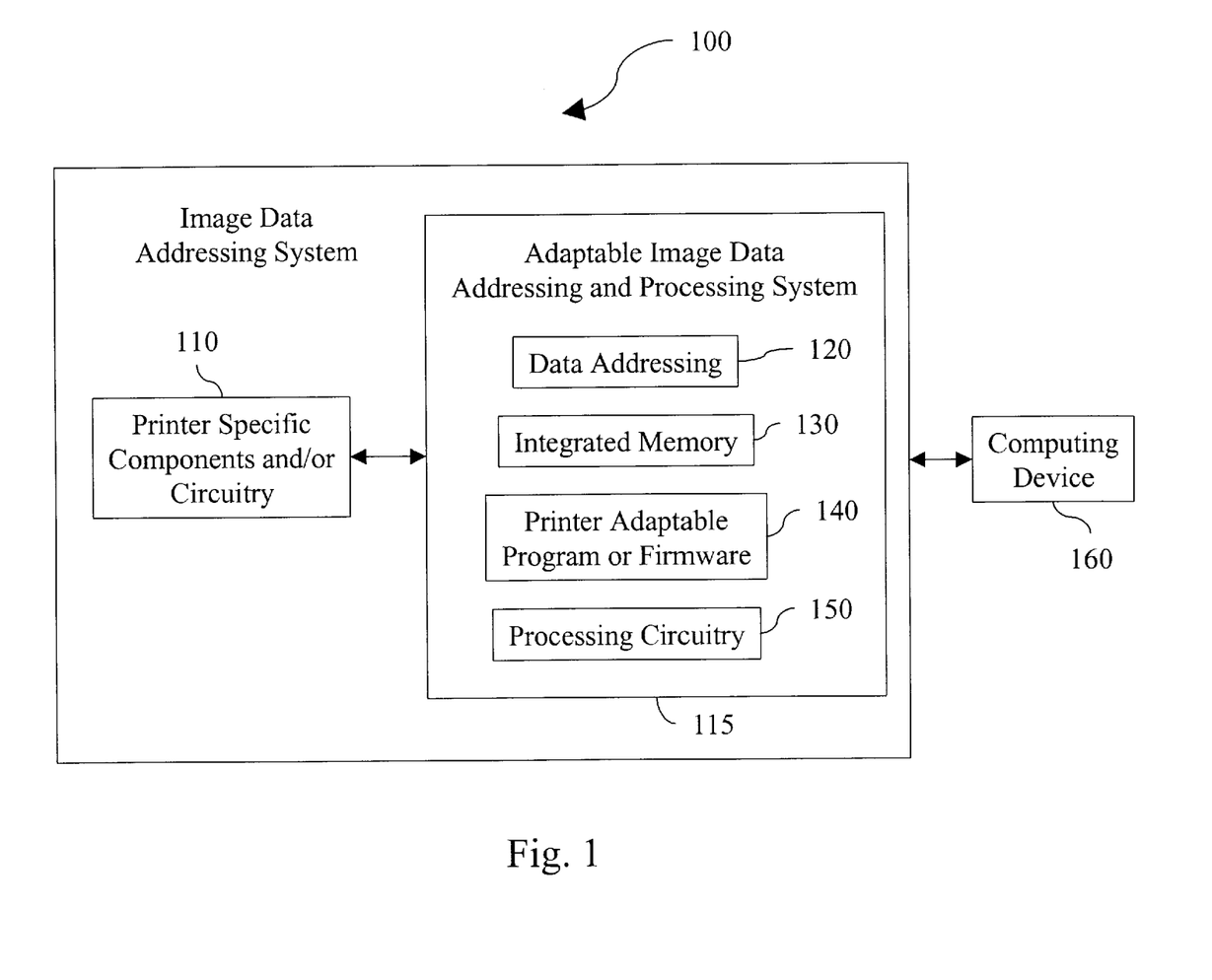
FIG. 1 illustrates one embodiment of an image data addressing system built in accordance with the present invention.

FIG. 1 illustrates one embodiment of an image data addressing system 100 built in accordance with the present invention. The image data addressing system 100 is implemented in a digital image printing system having printer specifics components and/or circuitry 110 and an adaptable image data addressing and processing system 115. The printer specific components and/or circuitry 110 includes various electrical and mechanical characteristics that correspond to the specific digital image printer. In ink jet digital image printing systems, some of the mechanical characteristics include, among other things, the number of ink jet nozzles, the mechanical separation of the ink jet nozzles, and the firing order of the ink jet nozzles. In other digital image printing systems, some of the electrical characteristics include, among other things, the data management interfacing between the digital image printing system and peripheral devices, the operating speed of any image data processing to be performed prior to printing, and the amount of available memory in the digital image printing system. The image data addressing system 100 is adaptable to accommodate various printing systems having differing printer specific components and/or circuitry 110.

The adaptable image data addressing and processing system 115 contains multiple internal devices that perform a variety of functions. Data addressing 120 is performed that provides data management of image data into an integrated memory 130. A printer adaptable program or firmware 140 enables the digital image printing system to accommodate the printer specific components and/or circuitry 110. The printer adaptable program or firmware 140 utilizes, at least in part, processing circuitry 150 to perform the adaptation to the printer specific components and/or circuitry 110 to ensure proper printing, reproduction, and display within the digital image printing system. A computing device 160 is external to the image data addressing system 100. Image data is provided by the computing device 160. The image data is retrieved from a memory contained within the computing device 160 in one embodiment of the invention. Alternatively, the computing device 160 operates to provide the image data from another memory location, external to the computing device 160, in another embodiment of the invention. The image data is stored into the integrated memory 130 in such a way that a consecutive portion of the integrated memory 130 remains available. For image printing systems that do not require the entirety of the integrated memory 130 at all times, the remaining portion of the integrated memory 130 is used for other functions as required by the digital image printing system.

Figure 2:
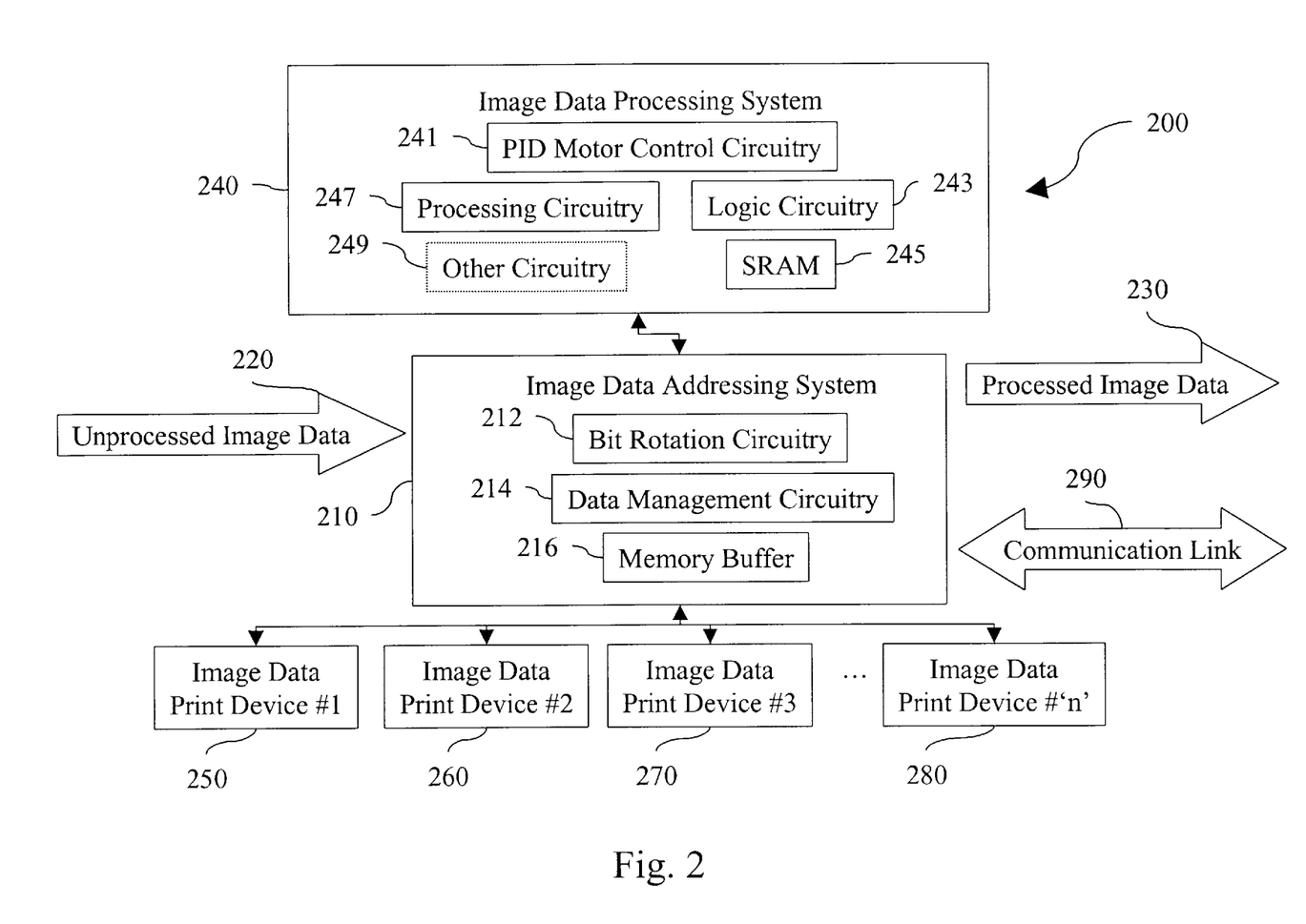
FIG. 2 illustrates a specific embodiment of the image data addressing system of FIG. 1.

FIG. 2 illustrates a specific embodiment 200 of the image data addressing system 100 of FIG. 1. An image data addressing system 210 and an image data processing system 240 operate collectively within a digital image printing system. The image data addressing system 210 receives a plurality of unprocessed image data 220, and through its collective operation with the image data processing system 240, produces the plurality of processed image data 230. A communication link 290 is used in certain embodiments of the invention to receive the plurality of unprocessed image data 220 and/or transmit the plurality of processed image data 230. The communication link 290 is used to provide the plurality of processed image data 230 and the plurality of unprocessed image data 220 either to or from a remote memory location or from a memory location located in a peripheral device within the digital image printing system. If desired, the communication link 290 transmits the plurality of processed image data 230 to a remote display or print device for reproduction of the plurality of unprocessed image data 220 after having undergone image data processing by the image data processing system 240.

The image data addressing system 210 contains multiple internal devices that perform a variety of functions. Bit rotation circuitry 212 performs bit rotation on the plurality of unprocessed image data 220 in preparation for digital image printing. Data management circuitry 214 cooperates with a memory buffer 216 and the bit rotation circuitry 212 to perform bit rotation on the plurality of unprocessed image data 220. The data management circuitry 214 stores the plurality of unprocessed image data 220 into the memory buffer 216 in such a way that a consecutive portion of the memory buffer 216 remains available for performing additional functions within either the image data addressing system 210 or the image data processing system 240. For image printing systems that do not require the entirety of the memory buffer 216 at all times, the remaining portion of the memory buffer 216 is used for other functions as required by the digital image printing system.

The image data addressing system 210 interfaces with a number of image data print devices, i.e., an image data print device #1 250, an image data print device #2 260, an image data print device #3 270, and an image data print device #'n' 280. The data management circuitry 214 of the image data addressing system 210 operates in such a way that regardless of the physical characteristics of the image data print devices 250–280, the plurality of unprocessed image data 220 may be processed to generate the plurality of processed image data 230. The operation of the image data addressing system 210 is intrinsically scaleable any of the image data print devices 250–280.

The image data processing system 240 also contains multiple internal devices that perform a variety of functions. Proportional-integral-differential (PID) motor control circuitry 241 is used to operate the motor that is used to translate and move the ink jet nozzles of an ink jet digital image printer. Logic circuitry 243 is used to perform image data processing on the plurality of unprocessed image data 220. Static random access memory (SRAM 245) is also employed to perform the image data processing on the plurality of unprocessed image data 220. Processing circuitry 247 and the logic circuitry 243 operate cooperatively to perform the image data processing on the plurality of unprocessed image data 220. Other circuitry 249 is employed in certain embodiments of the invention to perform additional functional operations known to those skilled in the art of image data processing.

Figure 3:
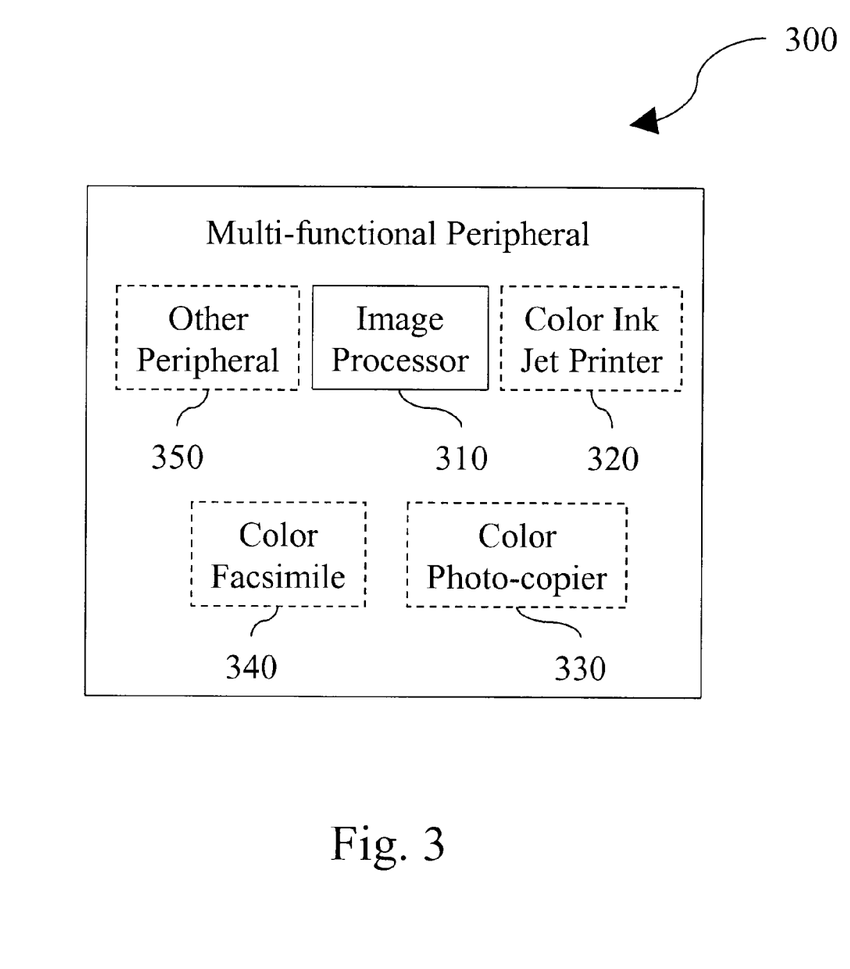
FIG. 3 illustrates one embodiment of a multi-functional peripheral that contains an image processor.

FIG. 3 illustrates one embodiment of a multi-functional peripheral 300 that contains an image processor 310. In certain embodiments, additional peripheral devices are included in the multi-functional peripheral 300. The multi-functional peripheral 300 contains any number of devices that cooperatively perform processing using the image processor 310 to prepare image data in a form suitable for printing or display that is of a high visible perceptual quality. Examples of such devices include color photo-copy machines, color facsimiles, color printers, black and white printers, and digital printers.

In certain embodiments of the invention, the multi-functional peripheral 300 contains several of the devices described above. In certain embodiments of the present invention, a color ink jet printer 320 is included in the multi-functional peripheral 300. In other embodiments, a color photo-copier 330 and a color facsimile 340 are both contained in the multi-functional peripheral 300 thereby providing multiple functions all within a single device. Those having skill in the art will recognize that any other peripheral 350 could be similarly included in the multi-functional peripheral 300 without departing from the scope and spirit of the invention. In certain embodiments, the multi-functional peripheral 300 provides a system in which various devices serve one another in receiving data in one form and converting it into another for appropriate display, reproduction, or transmission. In certain embodiments, the color photo-copier 330 converts a plurality of image data 1010 to a plurality of image data for display/print 1030 that is suitable for display or printing (See FIG. 10). The plurality of image data 1010 is then input into the color facsimile 340 wherein it is viewed or reproduced as the plurality of image data 1030. The color facsimile 340 performs converts the plurality of image data 1010 to a form suitable for transmission on the communication link 290 (See FIG. 2). Those having skill in the art will recognize that the image data addressing system 100, as described in FIG. 1, is contained within the multi-functional peripheral 300 in many of the various embodiments of the invention.

Figure 4:
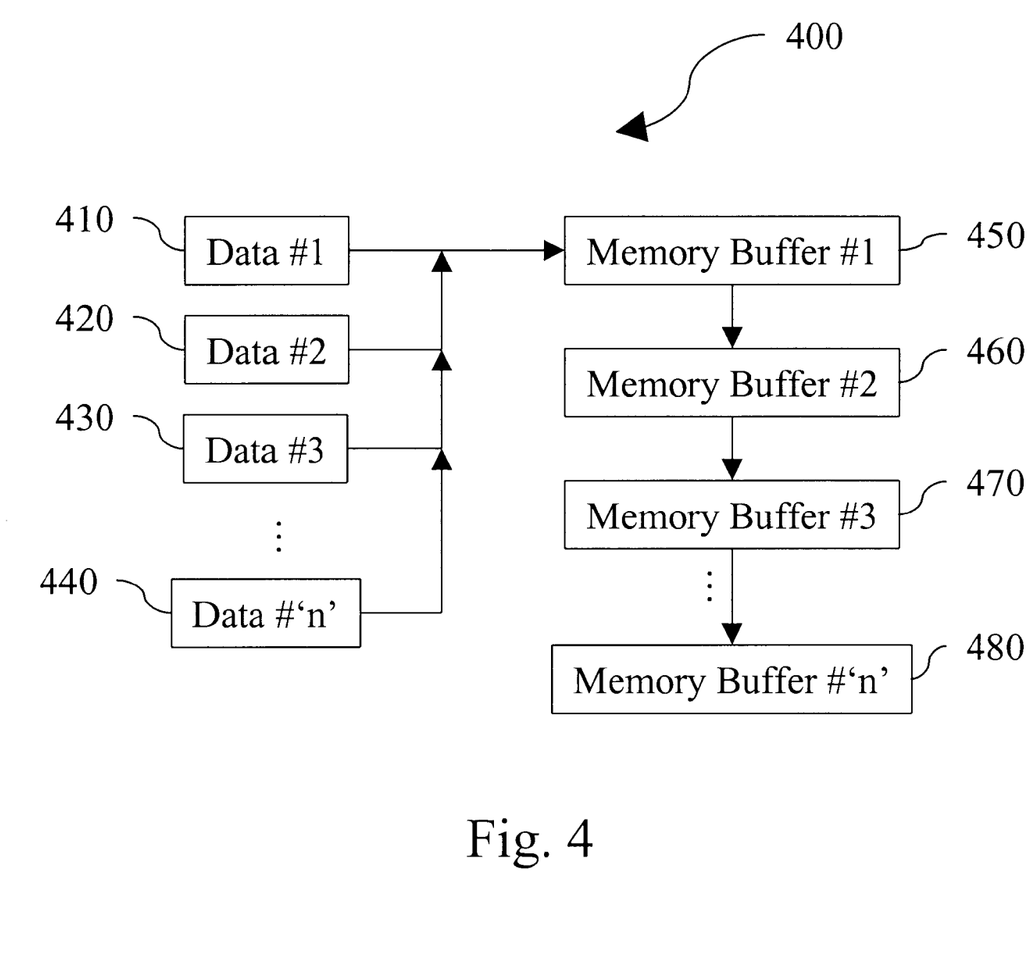
FIG. 4 illustrates a flow diagram of a plurality of image data in accordance with image data addressing system as performed by the present invention.

FIG. 4 illustrates a flow diagram 400 of a plurality of image data in accordance with image data addressing system as performed by the present invention. A plurality of image data in discrete form are shown as data #1 410, data #2 420, data #3 430, and data #'n' 440. The data are stored into memory buffer #1 450, buffer #2 460, buffer #3 470, and buffer #'n' 480. The sequential order in which the data 410–440 are stored in the memory buffers 450–480 as shown by the arrows as provided in the flow diagram 400. Initially, the data #1 410 is first transferred to the memory buffer #1 450. Then the data #2 420 is first transferred to the memory buffer #2 460. The memory buffer #1 450 is passed over by the data #2 420 because it is already filled with the data #1 410. Similarly, the data #3 430 is first transferred to the memory buffer #3 470. The memory buffer #1 450 and the memory buffer #2 460 are passed over by the data #3 430 because they are already filled with the data #1 410 and the data #2 420, respectively.

Finally, the last portion of image data shown in discrete form, namely, the data #'n' 440 is transferred to the memory buffer #'n' 480. In similar fashion to the transfer of image data in the above mentioned cases, the memory buffer #1 450, the memory buffer #2 460, and the memory buffer #3 470 are passed over by the data #'n' 440 because they are already filled with the data #1 410, the data #2 420, and the data #3 430, respectively. The sequential order of filling the memory buffers 450–480 provides for optimal image data addressing in accordance with the invention. In the flow diagram 400, to is shown that there is corresponding number of data 410–440 and memory buffers 450–480, namely 'n'. However, if there is a larger number of data 410–440 then there are memory buffers 450–480, then there is left remaining a consecutive number of memory buffers not having any and data stored therein.

Figure 5:
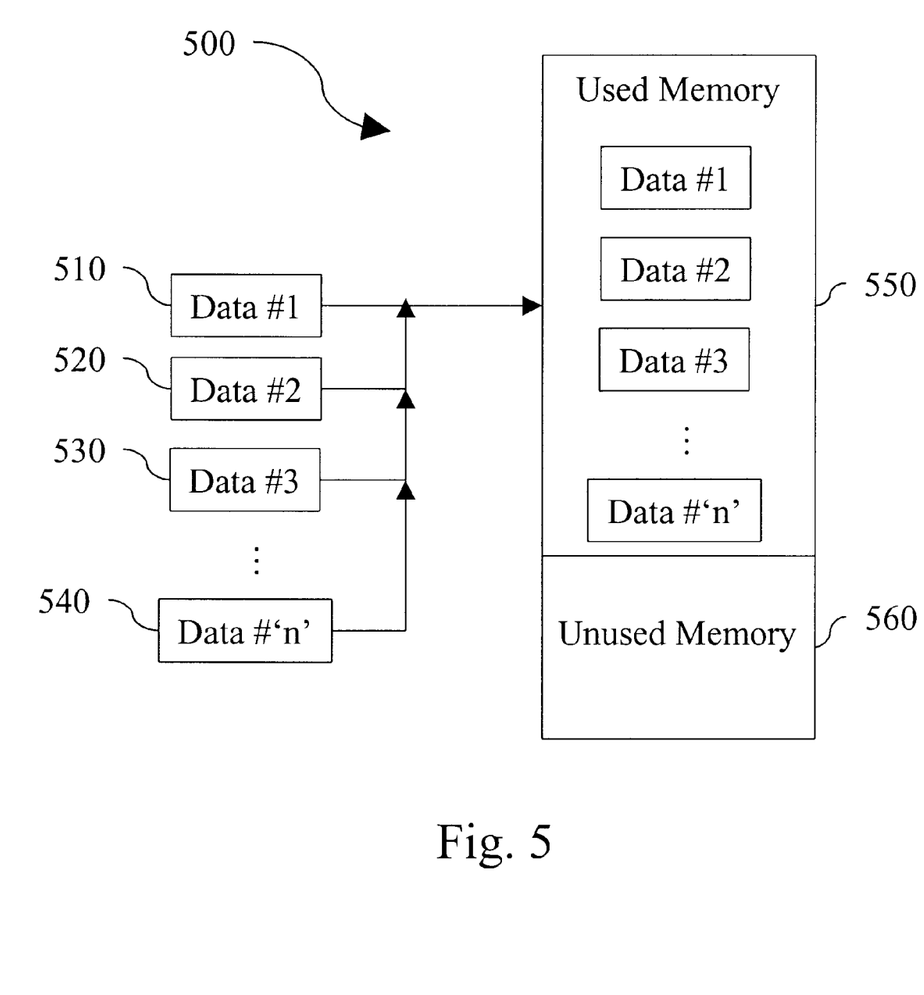
FIG. 5 illustrates a flow diagram of a plurality of image data into a portion of used memory.

FIG. 5 illustrates a flow diagram 500 of a plurality of image data, i.e., data #1 510, data #2 520, data #3 530, and data #'n' 540, into a portion of used memory 550. A portion of unused memory 560 remains empty and void of any image data. The flow diagram 500 is, in one perspective, one embodiment of the flow diagram 400 shown in FIG. 4. The sequential order in which the data 510–540 are transferred into the portion of used memory 550 is similar to the flow of data 410–440 into the memory buffers 450–480. The data #1 510 is first transferred into the portion of used memory 550 followed by the data #2 520, data #3 530, and data #'n' 540. However, there is at least one distinction between the flow diagram 400 and the flow diagram 500, in that, the portion of used memory 550 is an integrated portion of memory, wherein the memory buffers 450–480 of FIG. 4 are discrete and separate memory buffers. The portion of unused memory 560 and the portion of used memory 550 compose the entirety of memory available. The portion of unused memory 560 is available for additional functions as described in FIGS. 1–4 above. For example, the PID motor control circuitry 241 (see FIG. 2) uses the portion of unused memory 560 in certain embodiments of the invention.

Figure 6:
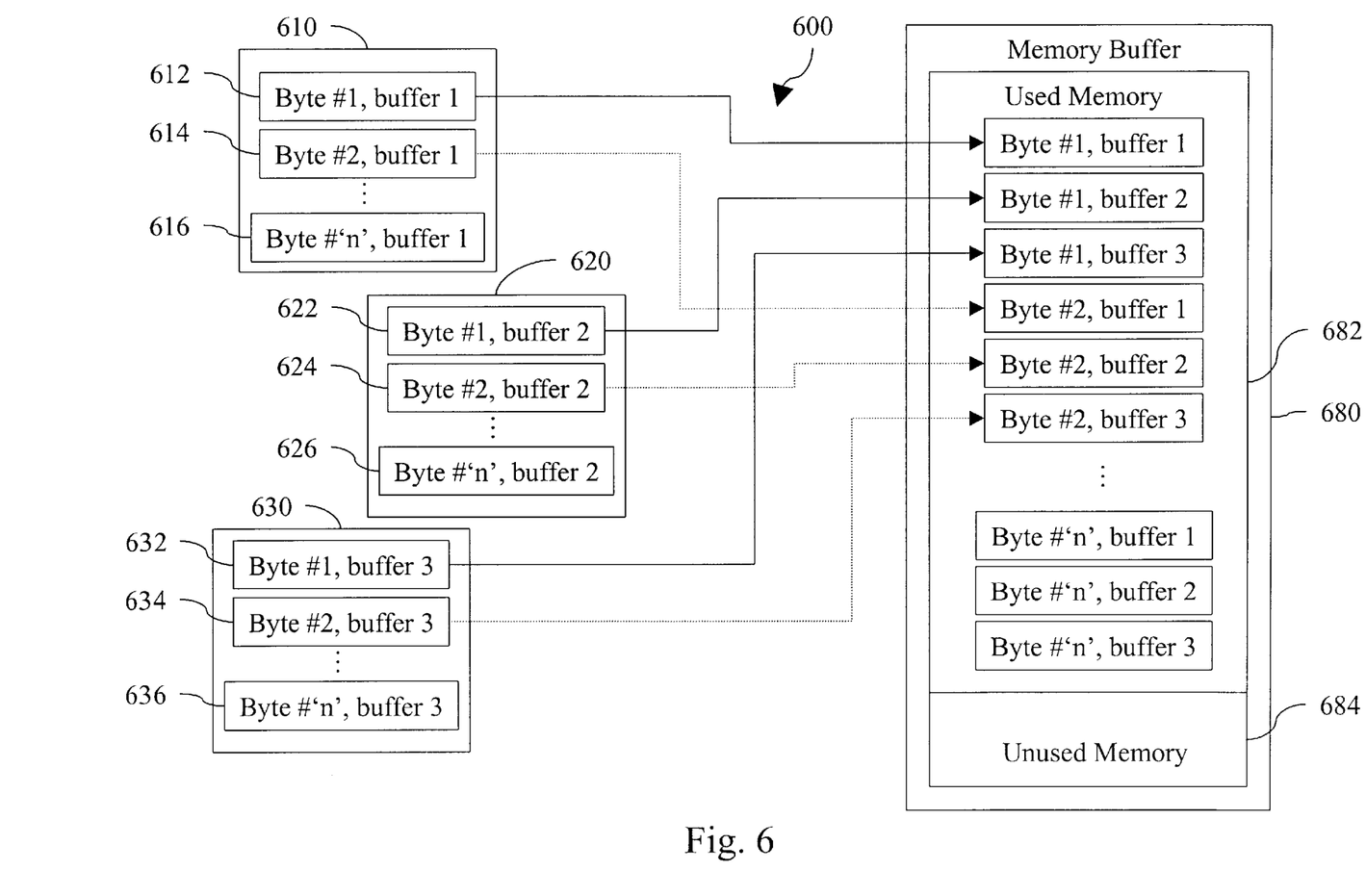
FIG. 6 illustrates a flow diagram of a plurality of image data contained within a plurality of image data buffers into a portion of used memory within a memory buffer.

FIG. 6 illustrates a flow diagram 600 of a plurality of image data contained within a plurality of image data buffers, i.e. image data buffer 610, image data buffer 620, and image data buffer 630, into a portion of used memory 682 within a memory buffer 680. As will be described below, the memory buffer 680 contains both the portion of used memory 682 and a portion of unused memory 684. Each of the image data buffers 610, 620 and 630 contain numerous bytes of image data. For example, the image data buffer 610 contains a byte #1, buffer 1 612, a byte #2, buffer 1 614, and byte #'n', buffer 1 614. Similarly, the image data buffer 620 contains a byte #1, buffer 2 622, a byte #2, buffer 1 624, and byte #'n', buffer 2 624; the image data buffer 630 contains a byte #1, buffer 3 632, a byte #2, buffer 3 634, and byte #'n', buffer 3 634.

The byte #1, buffer 1 612 of image data buffer 610 is first transferred to the memory buffer 680, specifically occupying the portion of used memory 682. Subsequently, the byte #1, buffer 2 622 of image data buffer 620 is transferred to the portion of used memory 682. The byte #1, buffer 3 632 of image data buffer 630 is then also transferred to the portion of used memory 682. In similar fashion, the byte #2, buffer 1 614 of image data buffer 610 is transferred to the portion of used memory 682; the byte #2, buffer 2 624 of image data buffer 620 is transferred to the portion of used memory 682; the byte #2, buffer 3 634 of image data buffer 630 is then also transferred to the portion of used memory 682. This procedure continues until all of the image data from the image data buffers 610, 620 and 630 are transferred to the portion of used memory 682 within the memory buffer 680 in accordance with the present invention. The transfer of image data is terminated when the last bytes of image data from each of the image data buffers 610, 620 and 630 are transferred to the portion of used memory 682. Namely, the byte #'n', buffer 1 616 of image data buffer 610 is transferred to the portion of used memory 682; the byte #'n', buffer 2 626 of image data buffer 620 is transferred to the portion of used memory 682; the byte #'n', buffer 3 636 of image data buffer 630 is then also transferred to the portion of used memory 682.

The portion of unused memory 682 and the portion of used memory 684 compose the entirety of the memory buffer 680. The portion of unused memory 682 is available for additional functions as described in FIGS. 1–5 above. For example, the PID motor control circuitry 241 (see FIG. 2) uses the portion of unused memory 682 in certain embodiments of the invention, similar to the portion of unused memory 560 in FIG. 5.

Figure 7:
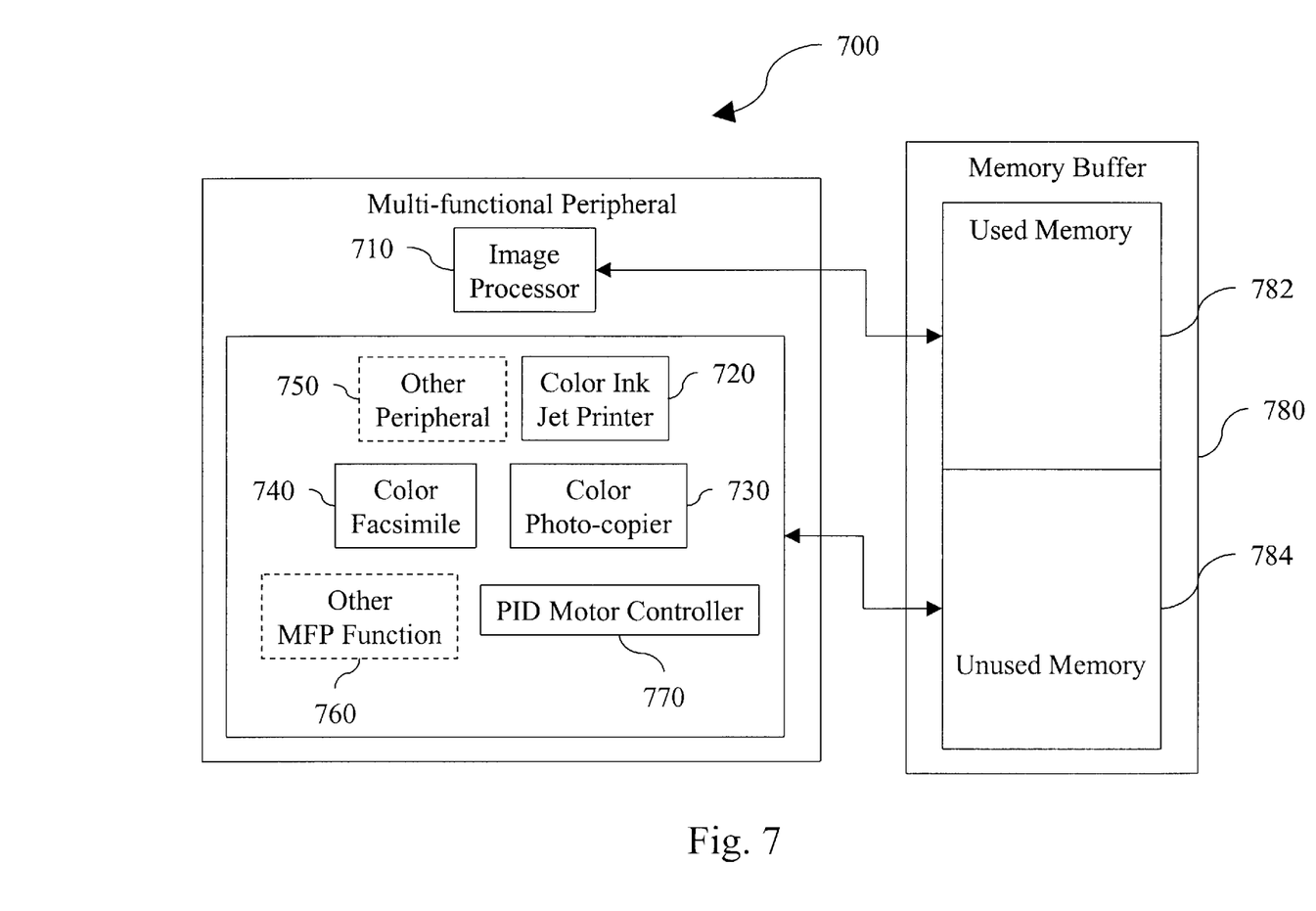
FIG. 7 illustrates an interface of one embodiment of a multi-functional peripheral interfacing with a memory buffer in accordance with the present invention.

FIG. 7 illustrates an interface of one embodiment of a multi-functional peripheral 700 interfacing with a memory buffer 780 in accordance with the present invention. Similar to the multi-functional peripheral 300 of FIG. 3, additional peripheral devices are included in the multi-functional peripheral 700. The multi-functional peripheral 700 contains any number of devices that cooperatively perform processing using the image processor 710 to prepare image data in a form suitable for printing or display that is of a high visible perceptual quality. Examples of such devices include color photo-copy machines, color facsimiles, color printers, black and white printers, and digital printers.

In certain embodiments of the invention, the multi-functional peripheral 700 contains several of the devices described above. In certain embodiments of the present invention, a color ink jet printer 720 is included in the multi-functional peripheral 700. A color photo-copier 730 and a color facsimile 740 are both contained in the multi-functional peripheral 700 thereby providing multiple functions all within a single device. Additionally, any other multi-functional peripheral function 760 could be contained in the multi-functional peripheral 700 to perform any number of desirable functions. One specific example of a desirable function is a PID motor controller 770. The PID motor controller 770 is the PID motor control circuitry 241 (see FIG. 2) in certain embodiments of the invention.

Those having skill in the art will recognize that any other peripheral 750 could be similarly included in the multi-functional peripheral 700 without departing from the scope and spirit of the invention. In certain embodiments, the multi-functional peripheral 700 provides a system in which various devices serve one another in receiving data in one form and converting it into another for appropriate display, reproduction, or transmission. In certain embodiments, the color photo-copier 730 converts a plurality of image data 1010 to a plurality of image data for display/print 1030 that is suitable for display or printing (See FIG. 10). The plurality of image data 1010 is then input into the color facsimile 740 wherein it is viewed or reproduced as the plurality of image data 1030. The color facsimile 740 performs converts the plurality of image data 1010 to a form suitable for transmission on the communication link 290 (See FIG. 2). Those having skill in the art will recognize that the image data addressing system 100, as described in FIG. 1, is contained within the multi-functional peripheral 700 in many of the various embodiments of the invention.

Figure 8:
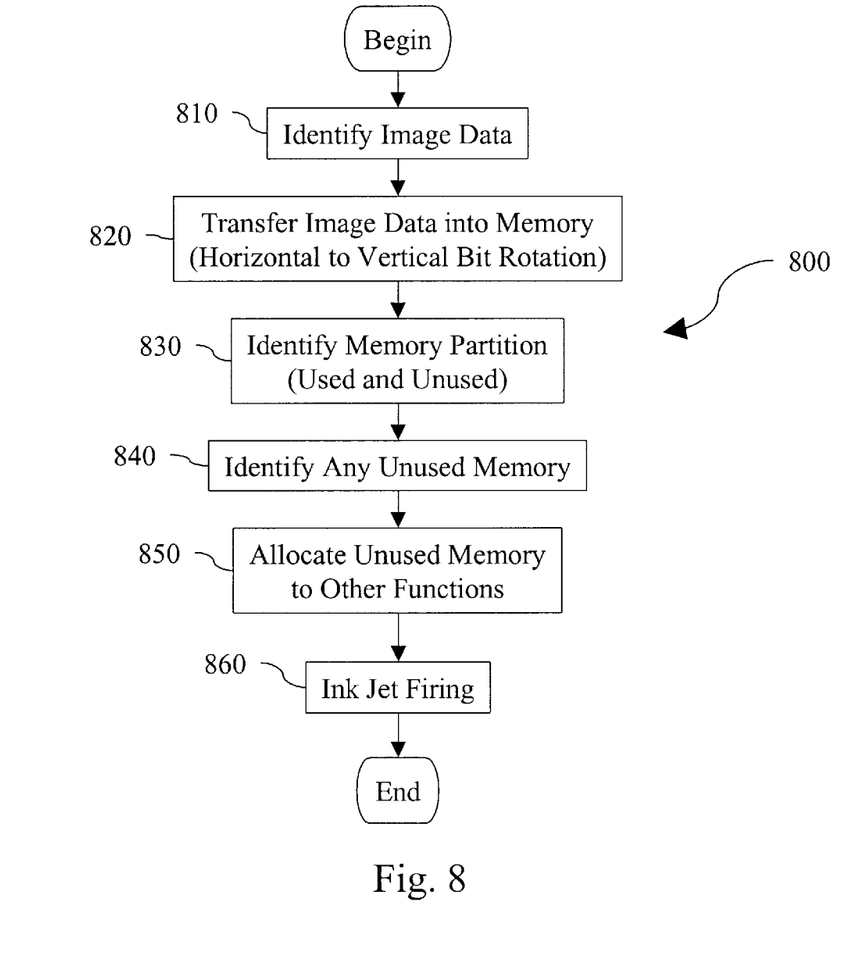
FIG. 8 illustrates a functional block diagram illustrating another embodiment of the present invention that performs image data addressing and allocation of unused memory, if any, to perform other functions.

FIG. 8 illustrates a functional block diagram 800 illustrating another embodiment of the present invention that performs image data addressing and allocation of unused memory, if any, to perform other functions. In a block 810, a plurality of image data is identified. The plurality of image data is transferred into memory in a block 820. Bit rotation is performed in the block 820, in that, the plurality of image data that is identified in the block 810 is rotated from a horizontal to a vertical format. As the plurality of image data that is transferred into the memory in the block 820 in accordance with the present invention, a used and an unused partition of the memory results. This used and unused partition results from the image data addressing employed in several of the FIGS. 1–7 above. The used and unused partition is particularly identified in a block 830. Specifically, the existence of any unused portion of the memory is identified in a block 840. The unused portion of the memory is allocated to other functions within a digital image printing system in a block 850. Finally, ink jet firing is performed in a block 860 using the image data that have been identified in the block 810 and transferred into memory in the block 820.

Figure 9:
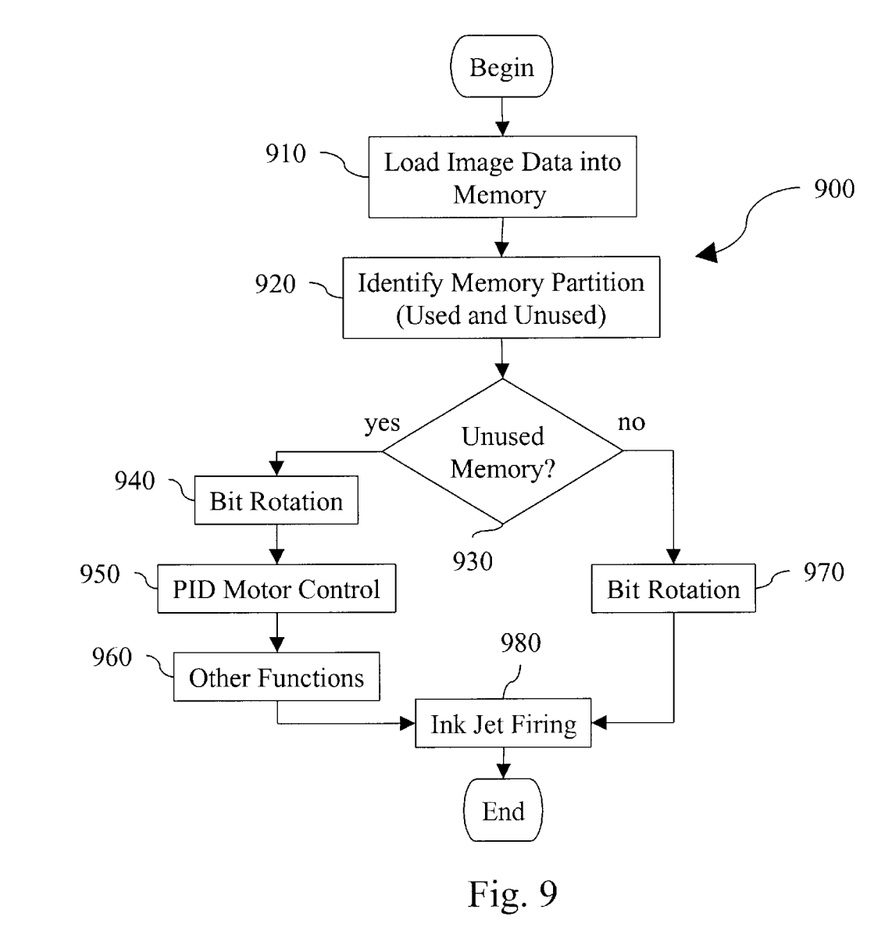
FIG. 9 illustrates a functional block diagram illustrating another embodiment of the present invention that performs image data addressing and allocation of unused memory, if any, to perform PID motor control and other functions.

FIG. 9 illustrates a functional block diagram 900 illustrating another embodiment of the present invention that performs image data addressing and allocation of unused memory, if any, to perform PID motor control and other functions. In a block 910, image data is loaded into a memory. Similar to the identification of the memory partition of used and unused memory in the block 830 of FIG. 8, the memory partition of used and unused memory is identified in a block 920 within the functional block diagram 900. In a decisional block 930, it is determined whether or not there exists any unused memory. If there exists no unused memory at all, the bit rotation is performed in a block 970. No other functions are performed using the memory in the event that there is no available memory. Alternatively, if there exists unused memory as determined by the decisional block 930, the bit rotation is performed in a block 930. PID motor control is also performed in a block 950. Additional functions are performed in a block 960.

Figure 10:
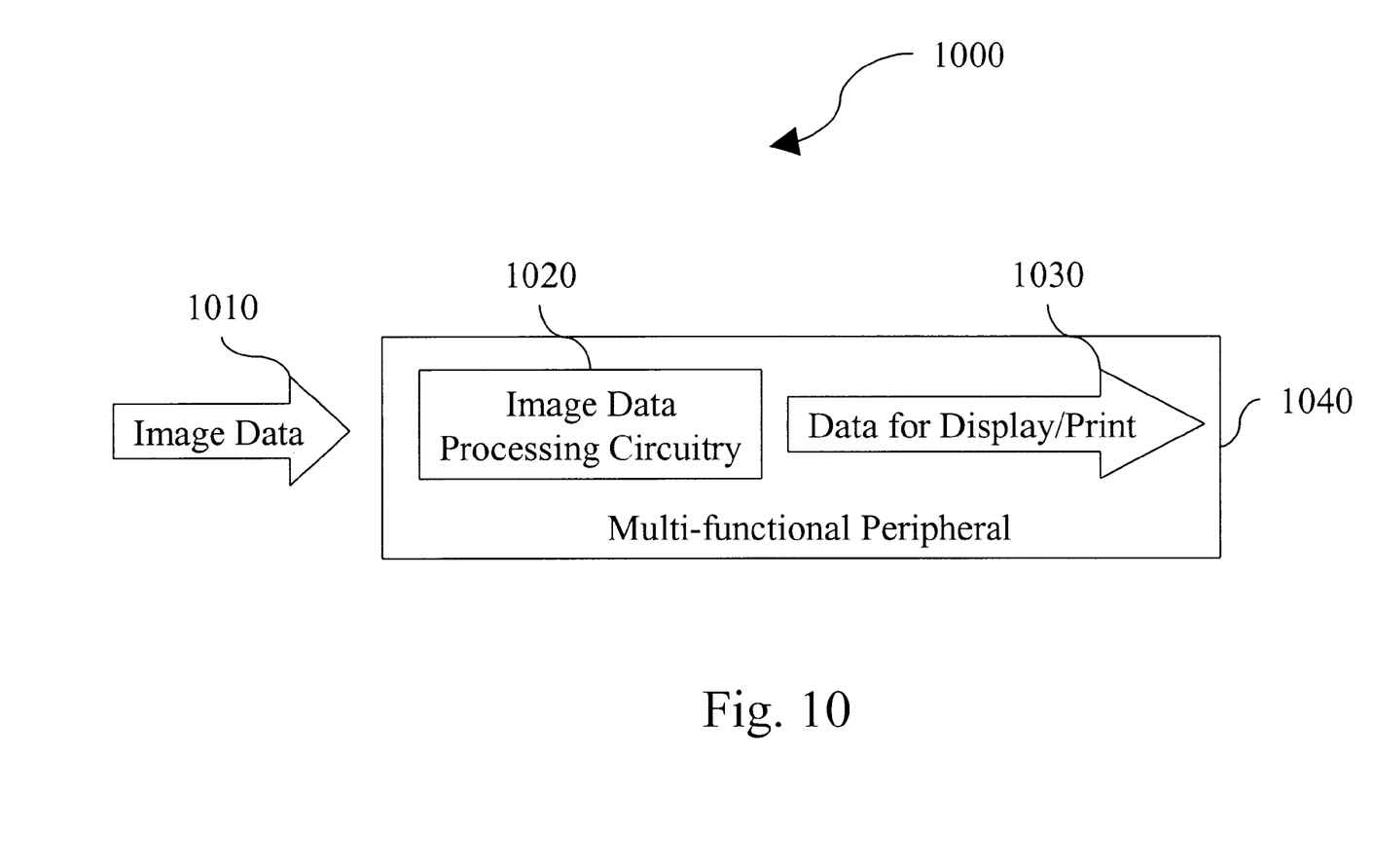
FIG. 10 illustrates a multi-functional peripheral that performs image processing to make a plurality of image data suitable for displaying or printing.

FIG. 10 is a system diagram illustrating another embodiment 1000 of the present invention. In particular, FIG. 10 illustrates a multi-functional peripheral 1040 that performs image processing to make a plurality of image data 1010 suitable for displaying or printing, i.e., into a plurality of image data for display/print 1030. In certain embodiments of the invention, the multi-functional peripheral 1040 is the multi-functional peripheral 300 as described in FIG. 3. The multi-functional peripheral 1040 contains image data processing circuitry 1020 that is used to process a plurality of image data 1010. The multi-functional peripheral 1040 converts the plurality of image data 1010 into the plurality image data for display/print 1030. The plurality image data for display/print 1030 is in a form suitable for printing on color ink jet printers in certain embodiments of the invention. In other embodiments, it is in a form suitable for laser printers. In certain embodiments of the invention, the processing circuitry 1020 is the image processor 310 as described in FIG. 3. In other embodiments, it is internal processing resources contained within any of the devices contained within the multi-functional peripheral 300 of FIG. 3 including the other peripheral 350.

Figure 11:
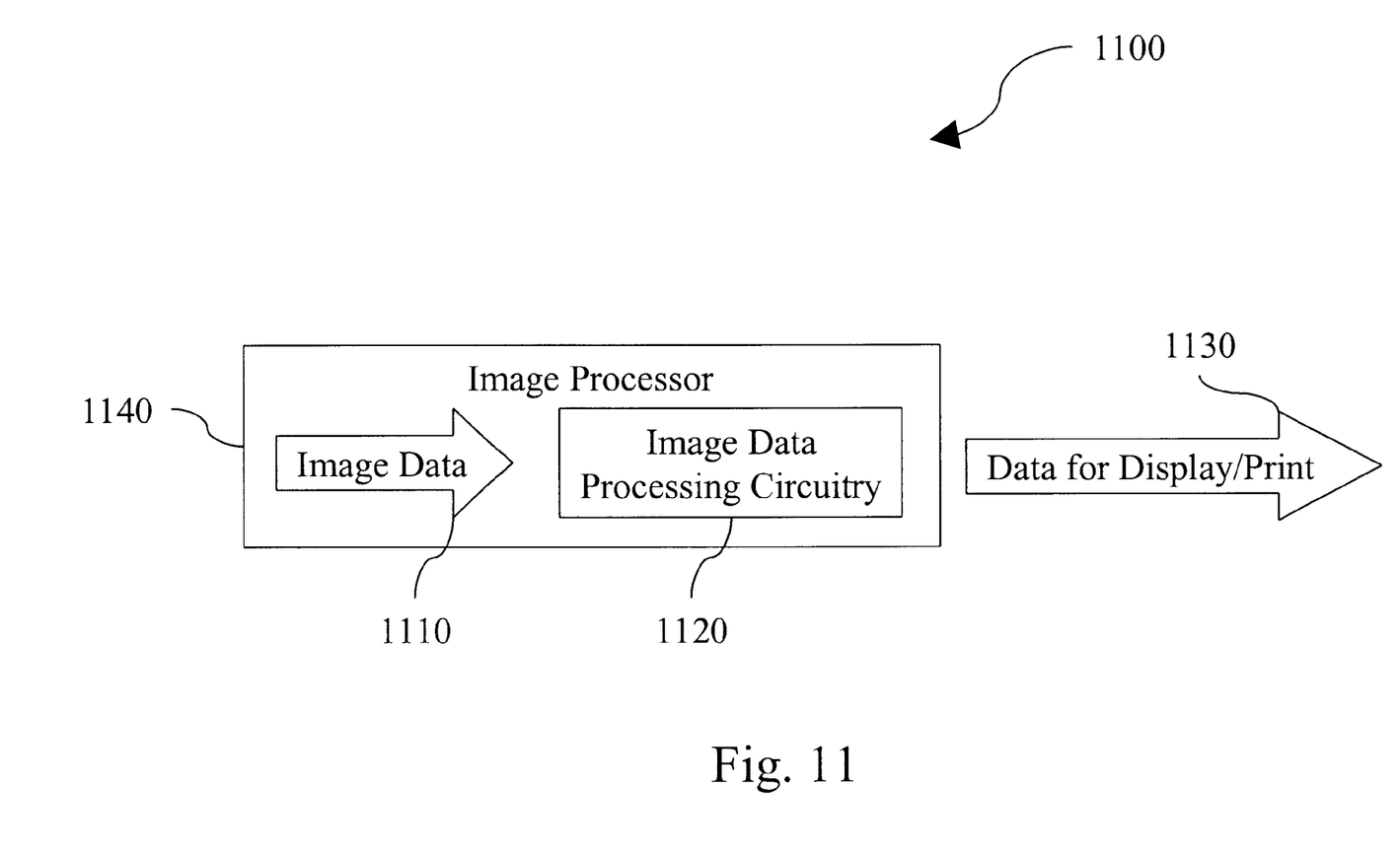
FIG. 11 illustrates an image processor that performs image processing to make a plurality of image data suitable for displaying or printing.

FIG. 11 is a system diagram illustrating another embodiment 1100 of the present invention. In particular, FIG. 11 illustrates an image processor 1140 that performs image processing to make a plurality of image data 1110 suitable for printing, i.e., into a plurality of image data for display/print 1130. The image processor 1140 contains image data processing circuitry 1120. In certain embodiments, the image processor 1140 is substantially the same as the image processor 310 as described in the multi-functional peripheral 300 of FIG. 3. The image data processing circuitry 1120 is used to process the plurality of image data 1110 into the plurality of image data for display/print 1130. In certain embodiments of the invention, the image processor 1140 is a processing system internal to any of the devices contained within the multi-functional peripheral 300 of FIG. 3 including the other peripheral 350.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A printer that prints digital image data, the printer having a processor and a type of printer selected from a plurality of types of printers, the processor comprising:
   a memory that stores the digital image data;
   a processing circuit that retrieves one of an available plurality of data addressing schemes stored in a data memory of the processing circuit and that corresponds to the type of printer selected from the plurality of types of printers and uses the data addressing scheme to address the digital image data stored within the memory; and
   the plurality of data addressing schemes corresponding to each of the plurality of types of printers.

2. The printer of claim 1, wherein the printer componet comprises a plurality of print nozzles; and
   wherein the type of printer of the plurality of types of printers is defined by a number of print nozzles.

3. The printer of claim 1, wherein the digital image data stored in the memory comprises bit rotated digital image data.

4. The printer of claim 3, wherein the processing circuit performs bit rotation of the bit rotated digital image data.

5. The printer of claim 1, further comprising:
   an interface circuit that interfaces with a computing device; and
   the bit rotation is performed by the processing circuit on image data received via the interface circuitry.

6. The printer of claim 1, wherein the printer comprises a plurality of print nozzles;
   wherein the type of printer of the plurality of types of printers is defined by a number of print nozzles; and
   wherein the performance of bit rotation is based on the number of print nozzles.

7. The printer of claim 1, wherein the printer component comprises a motor; and the memory has a consecutive portion used to perform motor control for the motor.

8. The printer of claim 1, wherein the printer is contained within a peripheral device.

9. The printer of claim 1, wherein the printer is contained within a stand alone device.

10. A printer that prints digital image data, the printer having a processor and a type of printer selected from a plurality of types of printers, the processor comprising:
    a memory that stores the digital image data;
    a processing circuit that can be programmed to retrieve one of a plurality of addressing schemes from a data memory that supports the type of printer selected from the plurality of types of printers and to use the addressing scheme to address the digital image data stored within the memory; and
    the plurality of data addressing schemes corresponding to each of the plurality of types of printers.

11. The printer of claim 10, wherein the printer comprises a plurality of print nozzles; and
    wherein the type of printer of the plurality of types of printers is defined by a number of print nozzles.

12. The printer of claim 10, wherein the digital image data stored in the memory comprises bit rotated digital image data.

13. The printer of claim 12, wherein the processing circuit performs bit rotation of the bit rotated digital image data.

14. The printer of claim 10, further comprising:
    an interface circuit that interfaces with a computing device; and the bit rotation is performed by the processing circuit on image data received via the interface circuitry.

15. The printer of claim 10, wherein the printer is contained within a peripheral device.

16. The printer of claim 10, wherein the printer is contained within a stand alone device.

17. A printer that prints digital image data, the printer having a processor and a type of printer selected from a plurality of types of printers, the printer comprising:
    a memory that stores the digital image data;
    a processing circuit that can be programmed to use one of a plurality of storage schemes stored in a data memory of the processing circuit that supports the type of printer selected from the plurality of types of printers to address the digital image data stored within the memory; and
    the plurality of data addressing schemes corresponding to each of the plurality of types of printers.

18. The printer of claim 17, wherein the printer component comprises a plurality of print nozzles; and
    wherein a type of printer component of the plurality of types of printer components is defined by a number of print nozzles.

19. The printer of claim 17, wherein the printer is contained within a peripheral device.

20. The method of claim 17, wherein the printer is contained within a stand alone device.

21. Printer control circuitry used with any of a plurality of types of print head mechanisms, the control circuitry comprising:

a processing circuit that communicatively couples with a selected one of the plurality of types of print head mechanisms;

a memory, coupled to the processing circuit, that stores image processing instructions that correspond to each of the plurality of types of print head mechanisms; and the processing circuit operates pursuant to those of the image processing instructions that correspond to the selected type of the plurality of types of print head mechanisms.

22. The printer control circuitry of claim 21 wherein the processing circuit identifies the selected one of the plurality of types of print head mechanisms.

23. The printer control circuitry of claim 22 wherein the processing circuit selects those of the image processing instructions based on the identification of the selected one of the plurality of types of print head mechanisms.

24. Printer control circuitry used with any of a plurality of types of printers, the control circuitry comprising;

a processing circuit that communicatively couples with a selected one of the plurality of types of printers;

the processing circuit being capable of operating to support each of the plurality of types of printers; and the processing circuit operates to support the selected one of the plurality of types of printers.

25. The printer control circuitry of claim 24 wherein the plurality of types of printers comprise print head mechanisms.

26. The printer control circuitry of claim 24 wherein the plurality of types of printers comprise motors.

27. The printer control circuitry of claim 24 wherein the processing circuit identifies the selected one of the plurality of types of printers.

* * * * *